(12) United States Patent
Baek et al.

(10) Patent No.: US 12,263,828 B2
(45) Date of Patent: Apr. 1, 2025

(54) SYSTEM FOR IMPROVING FUEL EFFICIENCY OF FUEL CELL VEHICLE AND CONTROL METHOD THEREOF

(71) Applicants: Hyundai Motor Company, Seoul (KR); Kia Corporation, Seoul (KR)

(72) Inventors: Gwan Ho Baek, Whasung-Si (KR); Joon Yong Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 237 days.

(21) Appl. No.: 18/073,953

(22) Filed: Dec. 2, 2022

(65) Prior Publication Data

US 2024/0025392 A1    Jan. 25, 2024

(30) Foreign Application Priority Data

Jul. 19, 2022 (KR) ........................ 10-2022-0089094

(51) Int. Cl.
*B60W 20/12* (2016.01)
*B60L 53/53* (2019.01)
*B60L 58/30* (2019.01)
*B60W 20/15* (2016.01)
*G01C 21/34* (2006.01)

(52) U.S. Cl.
CPC ............. *B60W 20/12* (2016.01); *B60L 53/53* (2019.02); *B60L 58/30* (2019.02); *B60W 20/15* (2016.01); *G01C 21/3469* (2013.01)

(58) Field of Classification Search
None
See application file for complete search history.

(56) References Cited

U.S. PATENT DOCUMENTS

2018/0222467 A1*  8/2018  Kaun ................... B60W 10/06
2021/0179108 A1*  6/2021  Kim .................... B60W 30/143

FOREIGN PATENT DOCUMENTS

KR    10-2021-0076288    6/2021

* cited by examiner

*Primary Examiner* — Hongye Liang
(74) *Attorney, Agent, or Firm* — Morgan, Lewis & Bockius LLP

(57) ABSTRACT

A system for improving fuel efficiency of a fuel cell vehicle, includes a fuel cell that provides driving energy to a vehicle, an information collection unit that collects travel route information of the vehicle including at least one of the altitude, speed limit and traffic condition of the road between the departure and the destination, and a controller that divides the travel route of the vehicle into a plurality of sections through the travel route information of the vehicle collected in the information collection unit, individually establishes the power generation strategy of the fuel cell for the plurality of sections divided, and controls the power generation of the fuel cell according to an established power generation strategy of the fuel cell when the vehicle arrives at each section, and control method thereof.

12 Claims, 9 Drawing Sheets

FIG. 3

| Speed limit | Traffic situation | Driving class of the Vehicle | | |
|---|---|---|---|---|
| | | Ascent | Flat | Downhill |
| Low | Smooth | Class 3 | Class 1 | Regeneration |
| | Delay | Class 5 | Class 2 | Class 1 |
| | Traffic jam | Class 8 | Class 6 | Class 4 |
| Medium | Smooth | Class 4 | Class 2 | Regeneration |
| | Delay | Class 6 | Class 3 | Regeneration |
| | Traffic jam | Class 8 | Class 6 | Class 4 |
| High | Smooth | Class 6 | Class 4 | Regeneration |
| | Delay | Class 7 | Class 5 | Regeneration |
| | Traffic jam | Class 8 | Class 6 | Class 4 |

SYSTEM FOR IMPROVING FUEL EFFICIENCY OF FUEL CELL VEHICLE AND CONTROL METHOD THEREOF

CROSS REFERENCE TO RELATED APPLICATION

The present application claims priority to Korean Patent Application No. 10-2022-0089094, filed on Jul. 19, 2022, the entire contents of which is incorporated herein for all purposes by this reference.

BACKGROUND OF THE PRESENT DISCLOSURE

Field of the Present Disclosure

The present disclosure relates to a system for improving fuel efficiency of a fuel cell vehicle and a control method thereof, and more particularly, to a system for improving fuel efficiency of a fuel cell vehicle which can improve fuel efficiency of the fuel cell vehicle by establishing a power generation strategy in an expected travel route of a fuel cell vehicle based on travel route information of the vehicle collected from a navigation device of the vehicle, etc., and controlling the power generation of the fuel cell according to the established power generation strategy, and a control method therefor.

Description of Related Art

Recently, as the depletion of fossil fuels and environmental pollution problems due to exhaust gas have emerged, alternative energy sources have been actively developed to solve the environmental problems such as global warming. In the vehicle field, research is being actively conducted to utilize the fuel cell system, which is evaluated as a future power generation technology, as a power source for vehicles because of its high power generation efficiency and no emission of pollutants due to power generation compared to existing power generation scheme.

A fuel cell is a device that receives hydrogen and air from an outside to generate electrical energy through an electrochemical reaction inside the fuel cell stack, and it may be used as a power source for driving a motor of an eco-friendly vehicle such as a fuel cell electric vehicle (FCEV).

A fuel cell mounted on a fuel cell vehicle has an output voltage of approximately −1 V to +1.2 V. While the present fuel cell has the advantage of being environmentally friendly, it has a problem in that it is not easy to rapidly supply power in response to a change in the output of the vehicle.

For example, due to the output characteristic in which the output voltage decreases rapidly in a high-speed driving range requiring a high voltage, the fuel cell cannot sufficiently supply the voltage required by the vehicle's motor, degrading the acceleration performance of the vehicle.

Furthermore, because the fuel cell generates electrical energy through an electrochemical reaction, if there is sudden change in load, the output voltage of the fuel cell is excessively changed, and thus durability of the fuel cell may be degraded.

Therefore, in general, a fuel cell vehicle utilizes a high-voltage battery (hereinafter referred to as a 'battery') together to respond to the change in the vehicle output as described above.

That is, the fuel cell corresponds to a main power source and generates electrical energy through an electrochemical reaction to provide driving energy for the fuel cell vehicle, and the battery corresponds to an auxiliary power source and provides the driving energy for the fuel cell vehicle together with the fuel cell as the main power source.

Furthermore, the electrical energy generated by the fuel cell is supplied to the vehicle load and the battery to drive the load or to charge the battery. The electrical energy charged in the battery is discharged from the battery when the vehicle load rapidly increases (e.g., when high output is required) to supplement the driving energy of the fuel cell vehicle.

Meanwhile, improving the vehicle fuel efficiency in the field of vehicle technology is a basic task that needs to be improved most importantly from the past, through the present, into the future.

This is also the case for fuel cell vehicles, and as mentioned above, it is difficult for fuel cells to rapidly supply power in response to changes in vehicle output. Therefore, to increase the fuel efficiency of the fuel cell vehicle, unnecessary power generation of the fuel cell should be minimized.

Because a conventional fuel cell vehicle does not require a driving force during deceleration or when the vehicle is in a stationary state, the fuel cell control logic of temporarily stopping the power generation of the fuel cell to block unnecessary energy consumption has been applied to the conventional fuel cell vehicle.

That is, a process of stopping and resuming power generation of the fuel cell (the process of fuel cell stop (FC Stop) and fuel cell restart (FC Restart)) if necessary during the operation of the vehicle may be performed.

For example, known is a technology for determining a point in which the deceleration of a vehicle is expected in advance based on navigation information and controlling to enter a fuel cell stop (FC Stop) when the current travelling speed of a vehicle at the point where the deceleration of a vehicle is expected is greater than a coasting line speed corresponding to a current location.

Here, the coasting line refers to a speed profile from the current location determined based on a unique value of a vehicle and a weight of the vehicle to the deceleration point, and the current traveling speed of the vehicle is compared with the speed according to the current location at the determined coasting line (coasting line speed).

However, the present technology does not reflect the actual fuel cell energy consumption because it determines whether to enter the fuel cell stop (FC Stop) by simply comparing the vehicle's current travelling speed with the coasting line speed. Because it is determined based on the current travelling speed of the vehicle and the coasting line speed according to the current location, it is impossible to optimize the fuel efficiency in the travel route from the departure to the destination of the vehicle (an entire travel route).

Furthermore, when the voltage required by the motor of the vehicle varies, the control logic for satisfying the voltage required of the motor by varying the power generation of the fuel cell has been applied to the conventional art. Accordingly, the output of the fuel cell is changed every moment, the durability of the fuel cell is degraded, and thus, it is difficult to drive the fuel cell in an output section where the energy consumption efficiency of the fuel cell is high.

Therefore, it is urgent to provide a technology that can drive the fuel cell in the output section where the energy consumption efficiency of the fuel cell is high, reflect the actual energy consumption of the fuel cell, and optimize the fuel efficiency in the entire travel route of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system for improving fuel efficiency of a fuel cell vehicle, configured for optimizing the fuel efficiency in the entire travel route of a vehicle by dividing an expected travel route of the vehicle into a plurality of driving sections based on the travel route information of the vehicle collected from the navigation device of the vehicle, etc., and establishing the power generation strategy of the fuel cell for each driving section, and reflecting the actual energy consumption of the fuel cell and driving the fuel cell in an output section where the energy consumption efficiency of the fuel cell is high by controlling the power generation of the fuel cell according to the established power strategy, and a control method thereof.

In various aspects of the present disclosure, a system for improving fuel efficiency of a fuel cell vehicle according to an exemplary embodiment of the present disclosure includes a fuel cell that provides driving energy to the vehicle, an information collection unit configured to collect travel route information of the vehicle including at least one of a road condition or a traffic condition for an expected travel route of the vehicle, and a controller that is connected to the information collection unit and configured to divide the expected travel route into a plurality of driving sections through the travel route information of the vehicle collected in the information collection unit, establishes a power generation strategy of the fuel cell for each driving section, and is configured to control power generation of the fuel cell according to a predetermined power generation strategy of the fuel cell in a corresponding driving section among the driving sections when the vehicle arrives at each driving section.

The controller of the system for improving fuel efficiency of a fuel cell vehicle according to an exemplary embodiment of the present disclosure may derive energy consumption efficiency of the fuel cell through the travel route information of the vehicle for each driving section, and may establish the power generation strategy of the fuel cell according to the derived energy consumption efficiency of the fuel cell.

The controller of the system for improving fuel efficiency of a fuel cell vehicle according to an exemplary embodiment of the present disclosure may determine driving energy consumption of the vehicle through the travel route information of the vehicle for each driving section, and may derive the energy consumption efficiency of the fuel cell according to a data map provided in advance according to the determined driving energy consumption of the vehicle, the data map may take the driving energy consumption of the vehicle determined according to the travel route information of the vehicle as an input thereof and the energy consumption efficiency of the fuel cell as an output thereof.

The controller of the system for improving fuel efficiency of a fuel cell vehicle according to an exemplary embodiment of the present disclosure may establish the power generation strategy of the fuel cell according to the energy consumption efficiency of the fuel cell derived based on the data map, and may establish the power generation strategy of the fuel cell so that the driving energy consumption of the vehicle determined for each driving section matches a reference value, wherein the reference value is the driving energy consumption of the vehicle at a point in time when the energy consumption efficiency of the fuel cell is highest.

The system for improving fuel efficiency of a fuel cell vehicle according to an exemplary embodiment of the present disclosure may further include a battery that provides driving energy to the vehicle. When the vehicle arrives at each driving section, the controller may be configured to control the power generation of the fuel cell according to a predetermined power generation strategy of the fuel cell in a corresponding driving section, and may compare charge amount of the battery with a preset value in each driving section and may calibrate the power generation strategy of the fuel cell according to a result of the comparing.

The controller of the system for improving fuel efficiency of a fuel cell vehicle according to an exemplary embodiment of the present disclosure may calibrate the power generation strategy of the fuel cell so that the power generation of the fuel cell is reduced when the charge amount of the battery is higher than the preset value.

The controller of the system for improving fuel efficiency of a fuel cell vehicle according to an exemplary embodiment of the present disclosure may calibrate the power generation strategy of the fuel cell so that the power generation of the fuel cell is increased when the charge amount of the battery is lower than the preset value.

The controller of the system for improving fuel efficiency of a fuel cell vehicle according to an exemplary embodiment of the present disclosure may derive energy consumption efficiency of the fuel cell through the travel route information of the vehicle for each driving section, may further determine whether regenerative braking of the fuel cell vehicle is able to performed, and may establish the power generation strategy of the fuel cell so that the power generation of the fuel cell is stopped when the regenerative braking of the fuel cell vehicle is able to be performed.

The system for improving fuel efficiency of a fuel cell vehicle may further include a battery that provides driving energy to the vehicle. When the regenerative braking of the fuel cell vehicle is able to be performed, the controller may be configured to control the battery to reduce a charge amount of the battery before the vehicle arrives at a driving section in which the power generation strategy of the fuel cell is established to stop the power generation of the fuel cell.

A method of controlling the system for improving fuel efficiency of the fuel cell vehicle according to an exemplary embodiment of the present disclosure includes collecting, by the information collecting unit, the travel route information of the vehicle including at least one of the road condition and the traffic condition for the expected travel route of the vehicle, dividing, by the controller, the expected travel route into the plurality of driving sections through the travel route information of the vehicle collected by the information collection unit, establishing, by the controller, the power generation strategy of the fuel cell for each driving section, and controlling the power generation of the fuel cell according to the power generation strategy of the fuel cell established by the controller in advance in the corresponding driving section when the vehicle arrives at each driving section.

In the dividing the expected travel route into the plurality of driving sections of the method of controlling the system for improving fuel efficiency of a fuel cell vehicle according to an exemplary embodiment of the present disclosure, energy consumption efficiency of the fuel cell may be derived by the controller through the travel route information of the vehicle for each driving section. In the establishing the power generation strategy of the fuel cell, the power generation strategy of the fuel cell may be established according to the energy consumption efficiency of the fuel cell derived by the controller.

In the dividing the expected travel route into the plurality of driving sections of the method of controlling the system for improving fuel efficiency of a fuel cell vehicle according to an exemplary embodiment of the present disclosure, driving energy consumption of the vehicle may be determined by the controller through the travel route information of the vehicle, and the energy consumption efficiency of the fuel cell may be derived by the controller based on a data map provided in advance according to the determined driving energy consumption of the vehicle. In the establishing the power generation strategy of the fuel cell, the driving energy consumption of the vehicle at a point in time when the energy consumption efficiency of the fuel cell is highest may be set by the controller as a reference value, and the power generation strategy of the fuel cell may be established so that the driving energy consumption of the vehicle determined for each driving section matches the reference value. The data map may take the driving energy consumption of the vehicle determined according to the travel route information of the vehicle as an input thereof and the energy consumption efficiency of the fuel cell as an output thereof.

The controlling the power generation of the fuel cell of the method of controlling the system for improving fuel efficiency of a fuel cell vehicle according to an exemplary embodiment of the present disclosure, may further include comparing, by the controller, charge amount of the battery with a preset value in each driving section; and calibrating, by the controller, the power generation strategy of the fuel cell according to a result of the comparing.

In the dividing the expected travel route into the plurality of driving sections of the method of controlling the system for improving fuel efficiency of a fuel cell vehicle according to an exemplary embodiment of the present disclosure, energy consumption efficiency of the fuel cell may be derived by the controller through the travel route information of the vehicle for each driving section, and it may be further determined by the controller whether regenerative braking of the fuel cell vehicle is able to be performed. In the establishing the power generation strategy of the fuel cell, the power generation strategy of the fuel cell may be established to stop the power generation of the fuel cell when the controller concludes that the regenerative braking of the fuel cell vehicle is able to be performed.

In the controlling the power generation of the fuel cell of the method of controlling the system for improving fuel efficiency of a fuel cell vehicle according to an exemplary embodiment of the present disclosure, when the controller concludes that the regenerative braking of the fuel cell vehicle is able to be performed, the battery may be controlled to reduce charge amount of the battery before the vehicle arrives at the driving section in which the power generation strategy of the fuel cell is established by the controller to stop the power generation of the fuel cell.

According to the system for improving fuel efficiency of a fuel cell vehicle and the control method of the present disclosure, the following effects are achieved.

First, the expected travel route of the vehicle includes a plurality of driving sections based on the travel route information of the vehicle collected from the navigation device of the vehicle, etc and the power generation strategy of the fuel cell is established for each driving section, so that the fuel efficiency may be optimized in the entire travel route of the vehicle.

Second, the actual energy consumption of the fuel cell may be reflected by controlling the power generation of the fuel cell according to the power generation strategy established based on the energy consumption efficiency of the fuel cell for each driving section.

Third, the power generation of the fuel cell is controlled according to the established power generation strategy, and when a certain condition is met, the power generation strategy of the fuel cell is calibrated so that the output section with high energy consumption efficiency of the fuel cell may be utilized. Accordingly, it has the effect of improving durability of the fuel cell.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a diagram for describing a driving energy consumption of a vehicle determined for each of driving sections divided through travel route information of the vehicle.

Figure 1:
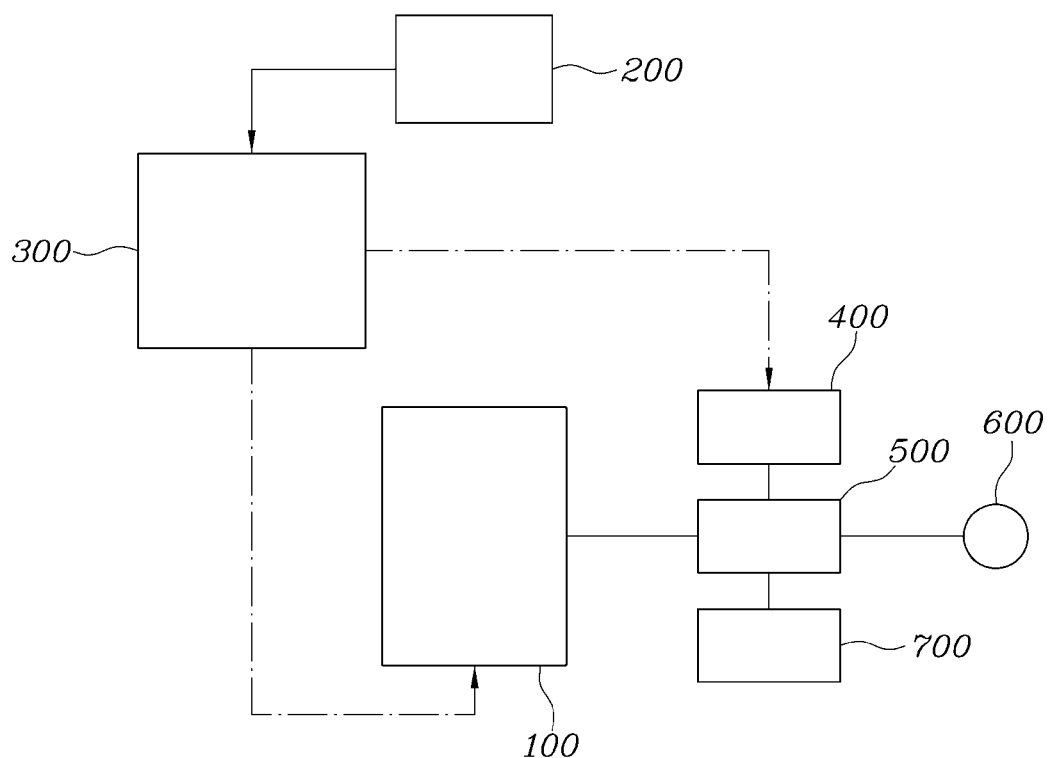
FIG. 1 is a diagram showing a system for improving fuel efficiency of a fuel cell vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the present specification, terms such as "comprises" or "have" are intended to designate the presence of a feature, number, step, operation, component, part, or combination thereof described in the specification, but it is to be understood that this does not preclude the possibility of addition or presence of one or more other features or numbers, steps, operations, components, parts, or combinations thereof.

Also, terms including an ordinal number, such as first, second, etc., may be used to describe various components, but the components are not limited by the terms. The above terms are used only for distinguishing one component from another component.

In describing the exemplary embodiments disclosed in the present specification, if it is determined that detailed descriptions of related known technologies may obscure the gist of the exemplary embodiments disclosed in the present specification, the detailed description thereof will be omitted. Furthermore, the accompanying drawings are only for easy understanding of the exemplary embodiments disclosed in the present specification, and the technical spirit disclosed herein is not limited by the accompanying drawings, and it should be understood to include all modifications, equivalents and substitutes included in the spirit and scope of the present disclosure.

A controller 300 according to the exemplary embodiment included in the present specification may include a communication device configured to communicate with another controller or a sensor to control a function assigned thereto, a memory configured to store an operating system, logic commands and input/output information, and at least one processor configured to perform determination, determination and decision necessary to control the assigned function.

Hereinafter, the configuration and working principle of various embodiments of the included disclosure will be described in detail with reference to the accompanying drawings, but the same or similar components are provided the same reference numbers regardless of the reference numerals, and the redundant description thereof will be omitted.

Figure 2:
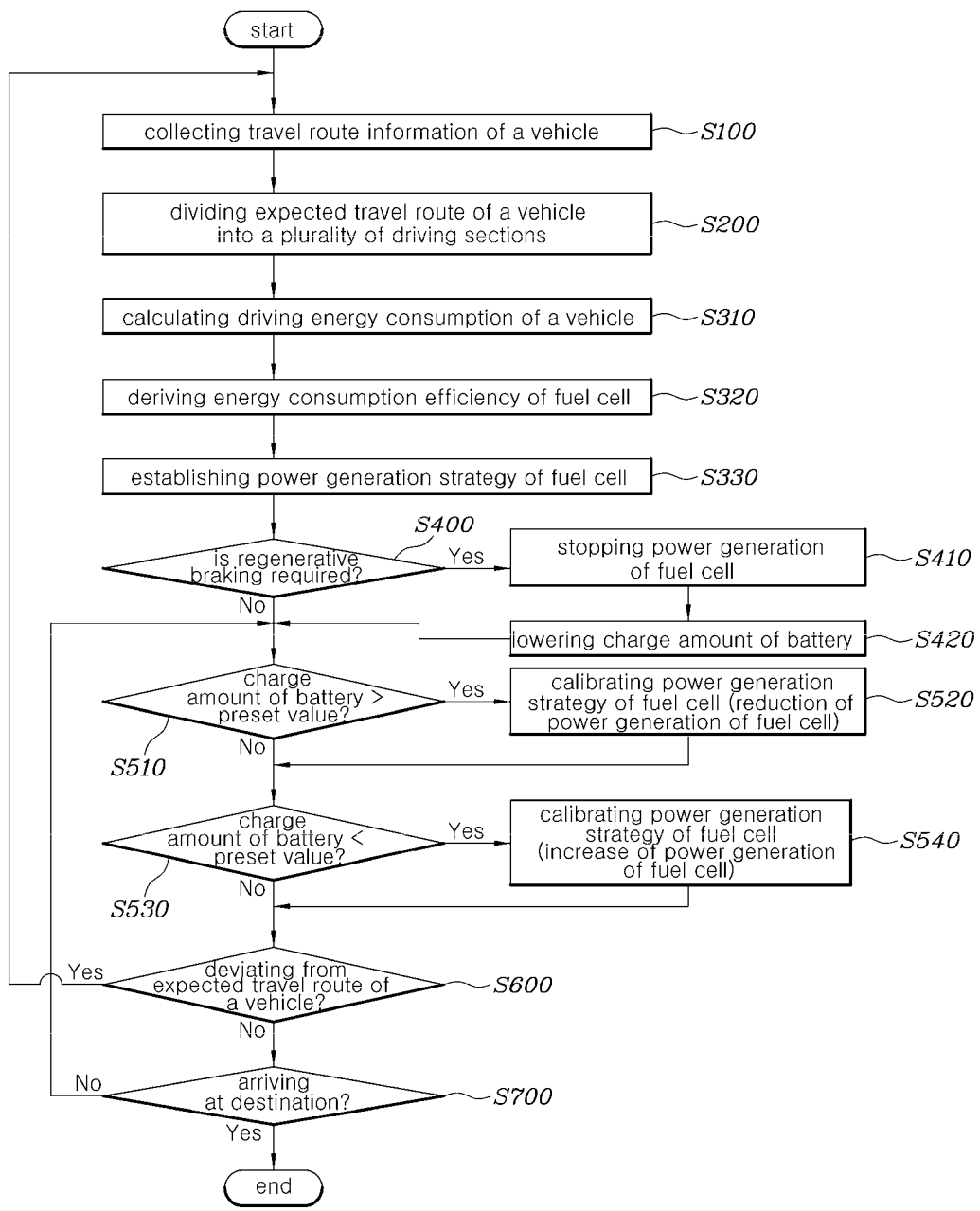
FIG. 2 is a flowchart of a method for controlling a system for improving fuel efficiency of a fuel cell vehicle according to an exemplary embodiment of the present disclosure.
Figure 4:
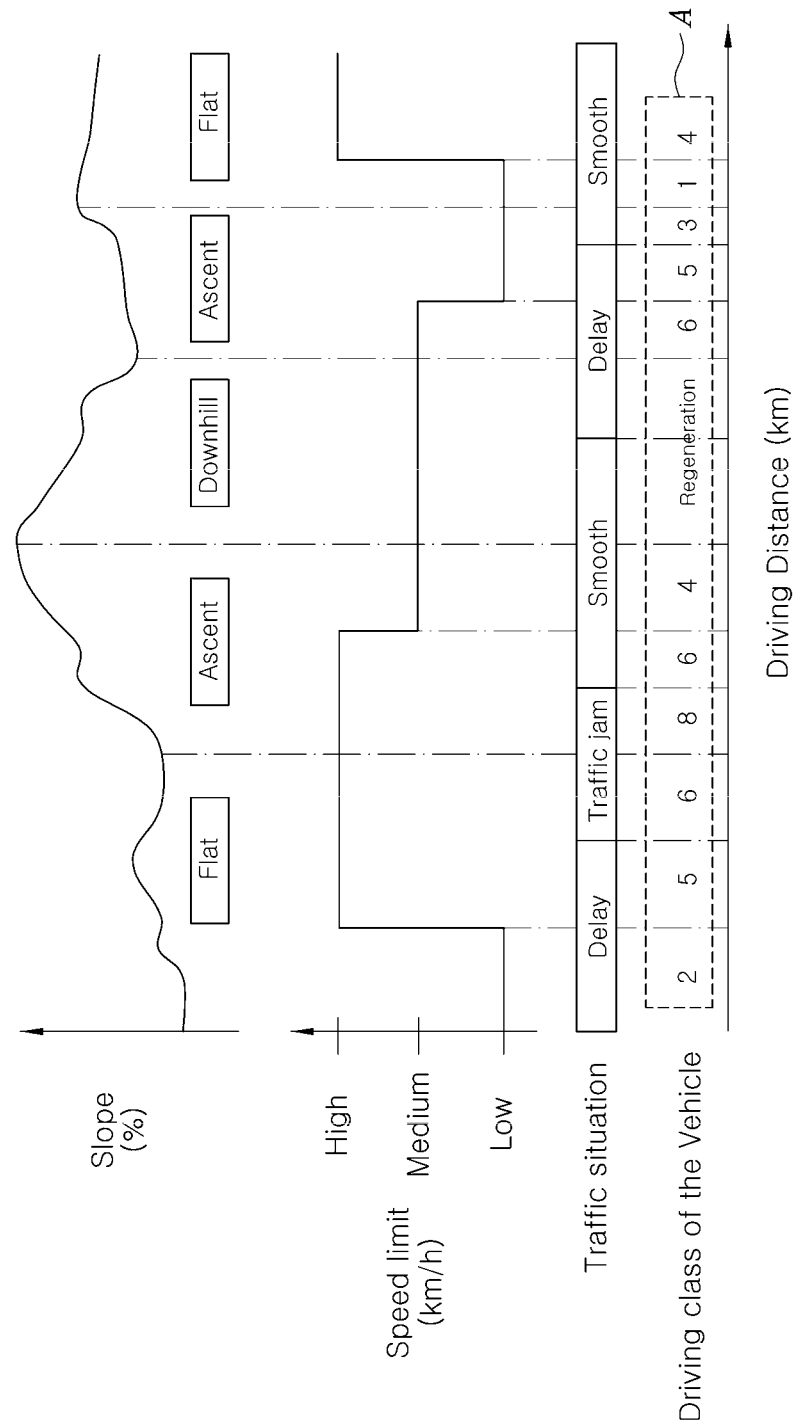
FIG. 4 is a diagram for describing a process of determining an amount of driving energy consumption of a vehicle for each of driving sections divided through travel route information of the vehicle.
Figure 5:
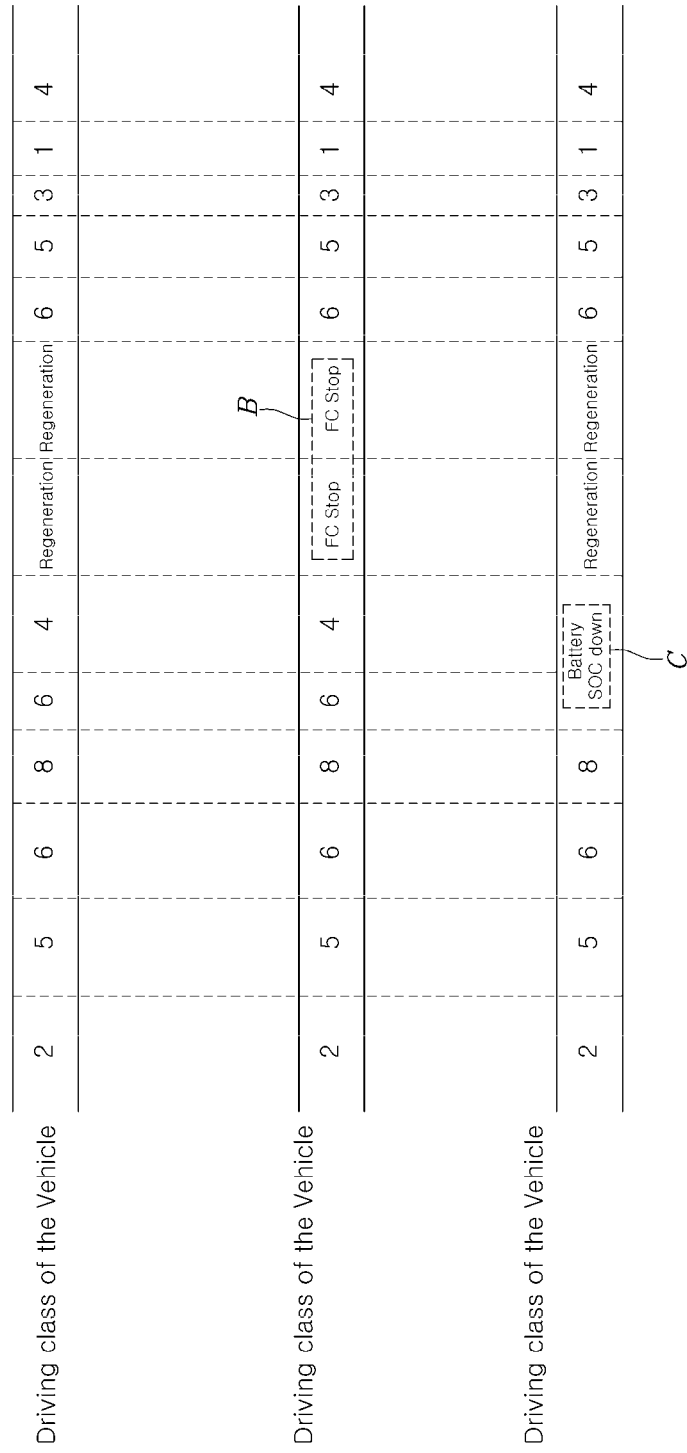
FIG. 5 is a diagram for describing a case in which regenerative braking of a fuel cell vehicle is performed.
Figure 6:
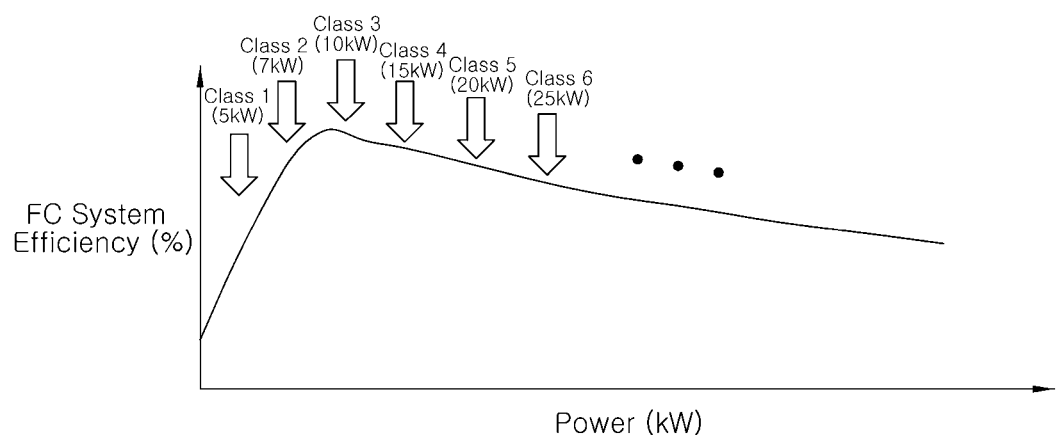
FIG. 6 is a graph for describing a data map in which the driving energy consumption of a vehicle determined in FIG. 3 is input and energy consumption efficiency of a fuel cell is output.
Figure 7:
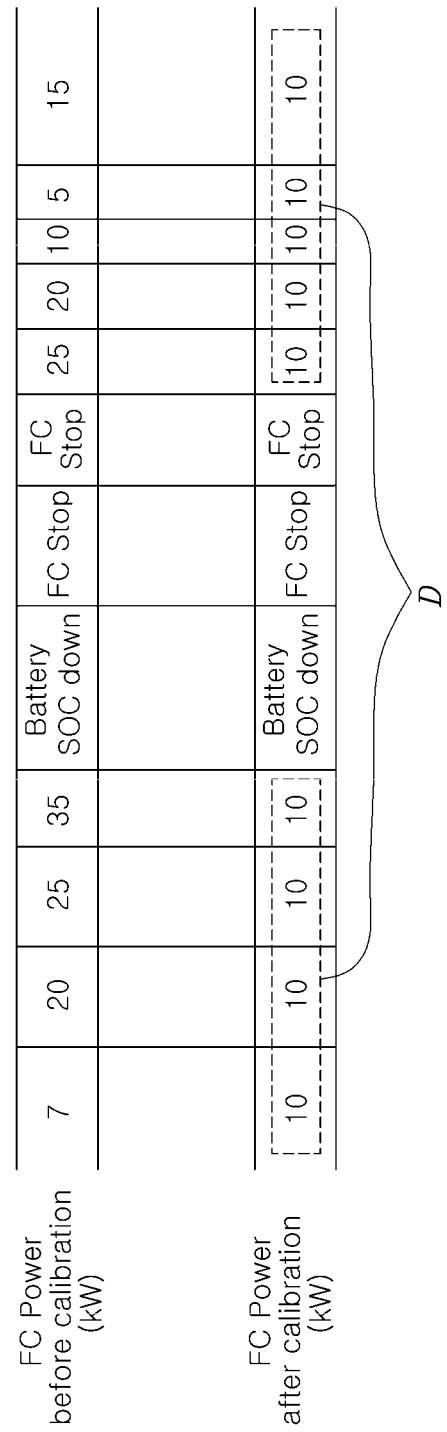
FIG. 7 is a diagram for describing a process of establishing a power generation strategy of a fuel cell according to a reference value.
Figure 8:
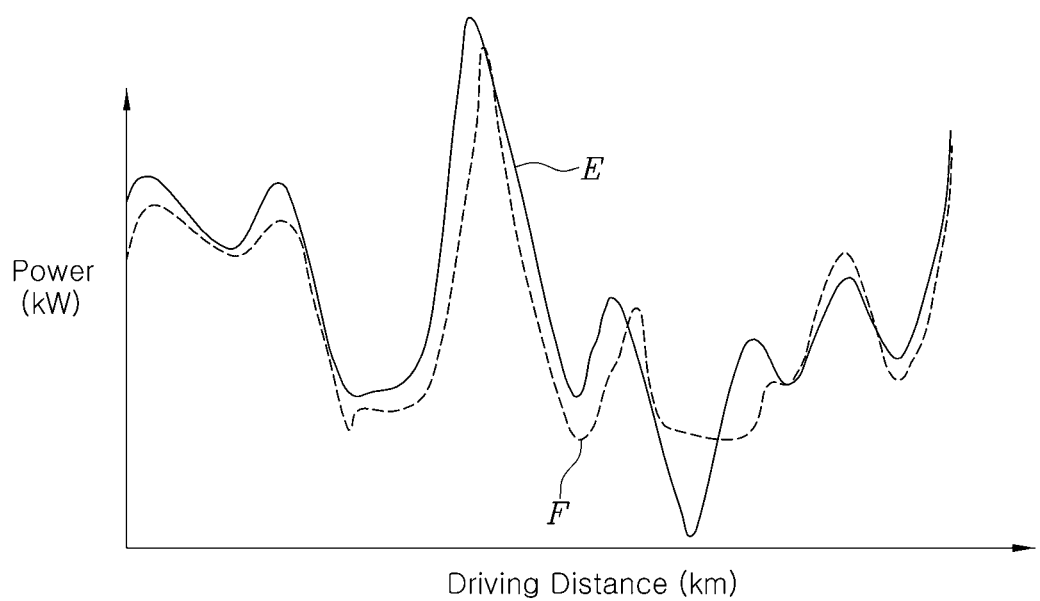
FIG. 8 is a graph showing a change in an output of a fuel cell compared to a required output according to a conventional art.
Figure 9:
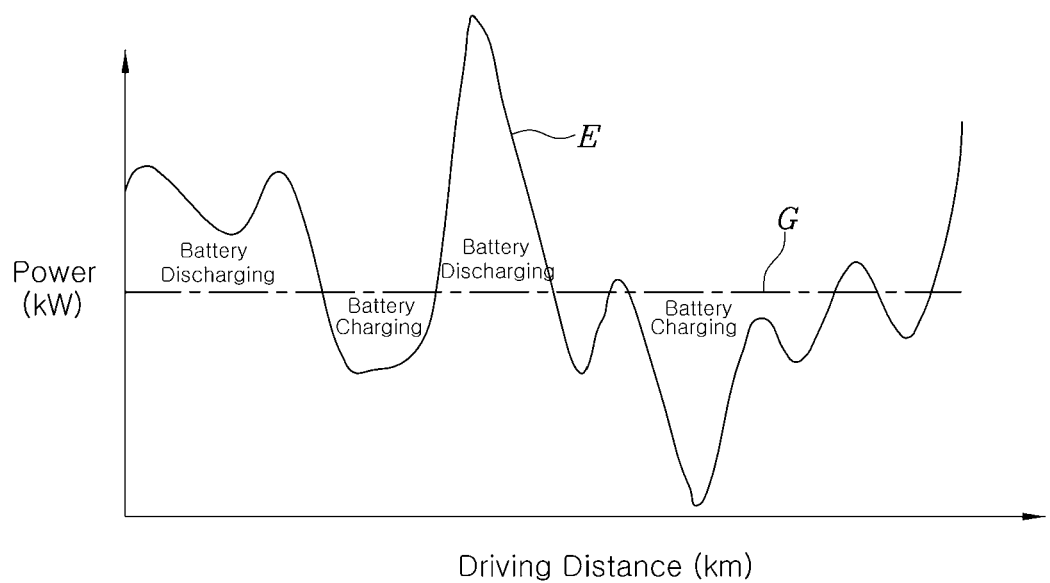
FIG. 9 is a graph showing a change in an output of a fuel cell compared to a required output according to an exemplary embodiment of the present disclosure.

FIG. 1 is a diagram showing a system for improving fuel efficiency of a fuel cell vehicle according to an exemplary embodiment of the present disclosure, FIG. 2 is a flowchart of a method for controlling a system for improving fuel efficiency of a fuel cell vehicle according to an exemplary embodiment of the present disclosure, FIG. 3 is a diagram for describing a driving energy consumption of a vehicle determined for each of driving sections divided through travel route information of the vehicle, FIG. 4 is a diagram for describing a process of determining an amount of driving energy consumption of a vehicle for each of driving sections divided through travel route information of the vehicle, FIG. 5 is a diagram for describing a case in which regenerative braking of a fuel cell vehicle is performed, FIG. 6 is a graph for describing a data map in which the driving energy consumption of a vehicle determined in FIG. 3 is input and energy consumption efficiency of a fuel cell 100 is output, FIG. 7 is a diagram for describing a process of establishing a power generation strategy of the fuel cell 100 according to a reference value, FIG. 8 is a graph showing a change in an output of the fuel cell 100 compared to a required output according to a conventional art, and FIG. 9 is a graph showing a change in an output of the fuel cell 100 compared to a required output according to an exemplary embodiment of the present disclosure.

With reference to FIGS. 1 to 7, a system for improving fuel efficiency of a fuel cell vehicle according to an exemplary embodiment of the present disclosure includes a fuel cell 100 that provides driving energy to a vehicle, an information collection unit 200 that collects travel route information of the vehicle including at least one of a road condition or a traffic condition for an expected travel route of the vehicle, and a controller 300 that divides the expected travel route into a plurality of driving sections through the travel route information of the vehicle collected in the information collection unit 200, establishes a power generation strategy of the fuel cell 100 for each driving section, and is configured to control the power generation of the fuel cell 100 according to a predetermined power generation strategy of the fuel cell 100 in a corresponding driving section among the driving sections when the vehicle arrives at each driving section.

To facilitate understanding of the present disclosure, the components of a control system of high-voltage parts applied to a general fuel cell vehicle will be described with reference to FIG. 1.

The fuel cell vehicle includes the fuel cell 100 that provides driving energy to a motor 600 of the vehicle, a high-voltage junction box 500 that receives power from the fuel cell 100 and is configured to control power supplied to a vehicle load 700, and the like as basic components, and may further include a battery 400 as an auxiliary power source.

Here, the vehicle load 700 may be understood to include other high-voltage parts that require power supply, such as a vehicle heater, an air conditioner, and a cooling fan, or a navigation device used for driving assistance of the vehicle.

For reference, the aforementioned navigation device is a device that collects information for driving assistance of a vehicle (for example, it refers to information on a travel route of a vehicle) and provides it to the vehicle's user, and it is preferable to understand it as a device included in the information collection unit 200 of the system for improving fuel efficiency of a fuel cell vehicle according to an exemplary embodiment of the present disclosure. In FIG. 1, the information collection unit 200 is illustrated separately from the vehicle load 700 to facilitate understanding of the present disclosure, but this should not be construed as limiting the content of the present disclosure.

That is, the system for improving fuel efficiency of a fuel cell vehicle according to an exemplary embodiment of the present disclosure has the fuel cell 100 that provides driving energy to the vehicle and the information collection unit 200 that collects the travel route information of the vehicle as basic components.

The 'travel route information of a vehicle' may include at least one of information on a road condition or a traffic condition for an expected travel route of a vehicle. Here, the information on a road condition may include a speed limit on the expected travel route of a vehicle, a slope of a road, and the like, and the information on a traffic condition may be understood to refer the information on a real-time traffic condition such as delay or congestion in vehicle driving due to traffic jams.

In the following specification, the information on a road condition is described on the premise of a speed limit and a slope of a road in the expected travel route, and the information on a traffic condition will be explained by dividing the real-time traffic situation into three main situations (smooth, delay, and traffic jam situations).

However, this is only an example for helping the understanding of the present disclosure, and the content of the present disclosure is not limited by these exemplary descriptions. That is, in the present disclosure, the information on a road condition or a traffic condition may further include various other information corresponding to the travel route information of a vehicle.

Furthermore, the 'expected travel route of a vehicle' refers to the travel route of the vehicle derived by the information collection unit 200 from the departure to destination of the vehicle, and it may be changed if the vehicle's user changes the destination or deviates from the route while driving.

For reference, since the specific operating principle for deriving the expected travel route of the vehicle from the information collection unit 200 corresponds to a matter which is obvious in the art, a description thereof will be omitted.

Accordingly, the system for improving fuel efficiency of a fuel cell vehicle according to an exemplary embodiment of the present disclosure includes the controller 300 that establishes the power generation strategy of the fuel cell 100 through the travel route information of the vehicle collected in the information collection unit 200, and is configured to control the power generation of the fuel cell 100 according to the established power generation strategy.

The controller 300 of the present disclosure may divide the expected travel route into a plurality of driving sections through the travel route information of the vehicle collected by the information collection unit 200, may establish the power generation strategy of the fuel cell 100 for each driving section, and may control the power generation of the fuel cell 100 according to a predetermined power generation strategy of the fuel cell 100 in a corresponding driving section among the driving sections when the vehicle arrives at each driving section.

In this regard, it will be described with reference to FIG. 3 and FIG. 4. FIG. 3 is a diagram for describing the driving energy consumption of the vehicle determined for each of the driving sections divided through the travel route information of the vehicle, and FIG. 4. is a diagram for describing a process of determining the driving energy consumption of the vehicle for each of the driving sections divided through the travel route information of the vehicle.

As will be described later, the controller 300 of the system for improving fuel efficiency of a fuel cell vehicle according to an exemplary embodiment of the present disclosure may determine the driving energy consumption of the vehicle through the travel route information of the vehicle for each driving section, may derive the energy consumption efficiency of the fuel cell 100 based on a data map provided in advance according to the determined driving energy consumption of the vehicle, and may establish the power generation strategy of the fuel cell 100 according to the derived energy consumption efficiency of the fuel cell 100.

In the instant case, the driving energy consumption of the vehicle may be expressed as a kind of grade. For example, the higher the driving energy consumption of the vehicle, the higher the grade, and the smaller the driving energy consumption of the vehicle, the lower the grade. Accordingly, in FIG. 3 and FIG. 4, the driving energy consumption of the vehicle is expressed as, for example, a driving class of the vehicle or Class 1.

In FIG. 4, the x-axis is the driving distance of the vehicle, which may be understood to refer to 'the expected travel route of the vehicle', and the y-axis is 'travel route information of the vehicle', and is divided into a speed limit, a slope and a traffic situation on the expected travel route of the vehicle.

Here, the speed limit may be subdivided into High, Medium and Low, the slope of the road may be further subdivided into Flat, Ascent and Downhill, and the traffic situation may be subdivided into Smooth, Delay and Traffic jam situations.

That is, the travel route information of the vehicle collected in the information collection unit 200 may be subdivided as above, and accordingly, as shown in FIG. 4, the expected travel route of the vehicle may be divided into a plurality of driving sections.

Furthermore, the controller 300 establishes the power generation strategy of the fuel cell 100 for each driving section, divided as described above. When the vehicle arrives at each driving section, the controller 300 may control the power generation of the fuel cell 100 according to the predetermined power generation strategy of the fuel cell 100 in the corresponding driving section.

Therefore, the system for improving fuel efficiency of a fuel cell vehicle according to an exemplary embodiment of the present disclosure can have the effect of optimizing the fuel efficiency in the entire travel route of the vehicle by dividing the expected travel route of the vehicle into a plurality of driving sections as described above and establishing the power generation strategy for the fuel cell 100 for each driving section.

On the other hand, the controller 300 of the system for improving fuel efficiency of a fuel cell vehicle according to an exemplary embodiment of the present disclosure may derive the energy consumption efficiency of the fuel cell 100 through the travel route information of the vehicle for each driving section, and may establish the power generation of the cell 100 according to the derived energy consumption efficiency of the fuel cell 100.

The controller 300 of the system for improving fuel efficiency of a fuel cell vehicle according to an exemplary embodiment of the present disclosure may determine the driving energy consumption of the vehicle through the travel route information of the vehicle for each driving section, and may derive the energy consumption efficiency of the fuel cell 100 based on the data map provided in advance according to the determined driving energy consumption of the vehicle. The data map may take as an input the driving energy consumption of the vehicle determined according to the travel route information of the vehicle and as an output the energy consumption efficiency of the fuel cell 100.

That is, the controller 300 of the system for improving fuel efficiency of a fuel cell vehicle according to an exemplary embodiment of the present disclosure determines the driving energy consumption of the vehicle through the travel route information of the vehicle for each driving section.

As mentioned above, the driving energy consumption of the vehicle may be expressed as the driving class of the vehicle. That is, region A of FIG. 4 refers to the driving energy consumption of the vehicle determined by the driving class of the vehicle.

Accordingly, the controller 300 of the system for improving fuel efficiency of a fuel cell vehicle according to an exemplary embodiment of the present disclosure derives the energy consumption efficiency of the fuel cell 100 based on the data map provided in advance according to the determined driving energy consumption of the vehicle.

In the instant case, the data map may take as an input the driving energy consumption of the vehicle determined according to the travel route information of the vehicle and as an output the energy consumption efficiency of the fuel cell 100.

With reference to FIG. 6, this will be descried in more detail. FIG. 6 is a graph for describing a data map in which the driving energy consumption of the vehicle determined in FIG. 3 is the input and the energy consumption efficiency of the fuel cell 100 is the output.

In FIG. 6, it may be understood that the x-axis refers to the power of the fuel cell 100 and the y-axis refers to the system efficiency of the fuel cell 100 (FC System Efficiency).

According to the graph of FIG. 6, when the output of the fuel cell 100 is 10 kW, the system efficiency of the fuel cell 100 is the highest. When the output of the fuel cell 100 is lower than or higher than 10 kW, the system efficiency of the fuel cell 100 is linearly reduced.

The driving energy consumption of the vehicle may be converted into a required output, which is determined according to the output of the fuel cell 100, so when the driving energy consumption of the vehicle is specified, the system efficiency of the fuel cell 100 corresponding thereto may be specified and derived.

According to the present principle, the data map of the present disclosure can take the driving energy consumption of the vehicle as an input thereof and the energy consumption efficiency of the fuel cell 100 as an output.

With reference to FIG. 6, for example, in any one of the expected travel route of the vehicle divided into a plurality of driving sections, if the driving energy consumption of the vehicle expressed as the driving class of the vehicle corresponds to Class 3, and in the instant case, the output of the fuel cell 100 corresponds to 10 kW, the system efficiency of the fuel cell 100 is derived to the highest state.

Furthermore, the controller 300 establishes the power generation strategy of the fuel cell 100 so that the state in which the system efficiency of the fuel cell 100 is the highest in the corresponding driving section is maintained. In other words, in the instant case, the controller 300 fixes the output of the fuel cell 100 at 10 kW and is configured to control it to be kept constant.

This process may be equally performed in the entire sections of the expected travel route of the vehicle divided into a plurality of driving sections. As a result, the power generation strategy of the fuel cell 100 is established based on the energy consumption efficiency of the fuel cell 100 for each driving section, and the power generation of the fuel cell 100 is controlled according to the established power generation strategy, so that there is the advantage of reflecting the actual energy consumption of the fuel cell 100.

For reference, the numerical values (5 kW, 7 kW, 10 kW, 15 kW, 20 kW, 25 kW) described in FIG. 6 are merely exemplary values to help the understanding of the present disclosure, and these descriptions may not be construed as limiting the content of the present disclosure. Each numerical value is understood as a value which may vary in accordance with the specifications of the fuel cell 100 and the control conditions of the fuel cell 100 system.

Meanwhile, FIG. 7 is a diagram for describing a process of establishing a power generation strategy of the fuel cell 100 according to a reference value, FIG. 8 is a graph showing a change in an output of the fuel cell 100 compared to a required output according to a conventional art, and FIG. 9 is a graph showing a change in an output of the fuel cell 100 compared to a required output according to an exemplary embodiment of the present disclosure.

With reference FIGS. 7 to 9, the controller 300 of the system for improving fuel efficiency of a fuel cell vehicle according to an exemplary embodiment of the present disclosure establishes the power generation strategy of the fuel cell 100 according to the energy consumption efficiency of the fuel cell 100 derived based on the data map, and can establish the power generation strategy of the fuel cell 100 so that the driving energy consumption of the vehicle determined for each driving section matches the reference value, wherein the reference value is the driving energy consumption of the vehicle at a point in time when the energy consumption efficiency of the fuel cell 100 is the highest.

First, with reference to FIG. 8, it may be understood that the x-axis represents the driving distance of the vehicle, and the y-axis represents the required output of the vehicle or the output of the fuel cell 100. Furthermore, E in FIG. 8 is a curve representing a change in the required output of the vehicle, and F is a curve representing a change in the output of the fuel cell 100.

According to FIG. 8, it may be seen that the output of the fuel cell 100 is also changed according to the change in the required output of the vehicle in the conventional art.

Because the fuel cell 100 generates electrical energy through an electrochemical reaction, when the required output of the vehicle is excessively fluctuated, the durability of the fuel cell 100 is degraded. Furthermore, when the required output of the vehicle is rapidly increased (for example, in case of instantaneous high-speed driving), there is a disadvantage in that acceleration performance of the vehicle is degraded because the voltage required by the motor 600 of the vehicle is not sufficiently supplied.

Accordingly, as shown in FIG. 9, the system for improving fuel efficiency of a fuel cell vehicle according to an exemplary embodiment of the present disclosure is configured to control the output of the fuel cell 100 to be maintained at a specific reference value, securing the durability of the fuel cell 100 while improving the fuel efficiency of a fuel cell vehicle.

In FIG. 9, it may be understood that the x-axis represents the driving distance of the vehicle, and the y-axis represents the required output of the vehicle or the output of the fuel cell 100. Furthermore, E of FIG. 9 is a curve showing a change in the required output of the vehicle, and G is a curve showing that the output of the fuel cell 100 is controlled to be maintained at a specific reference value according to an exemplary embodiment of the present disclosure.

The controller 300 of the present disclosure sets the 'driving energy consumption of the vehicle at a point in time when the energy consumption efficiency of the fuel cell 100 is the highest' as a reference value, and can establish the power generation strategy of the fuel cell 100 so that the driving energy consumption of the vehicle determined for each driving section matches the reference value.

This will be described with reference to FIG. 7. The table shown at the top of FIG. 7 shows 'the output of the fuel cell 100 before establishing the power generation strategy of the fuel cell 100 so that the driving energy consumption of the vehicle determined for each driving section matches the reference value (FC Power before calibration)', and the table shown at the bottom shows 'the output of the fuel cell 100 after establishing the power generation strategy of the fuel cell 100 so that the driving energy consumption of the vehicle determined for each driving section matches the reference value (FC Power after calibration)'.

For reference, it is preferable to understand that the tables shown at the top and bottom in FIG. 7 are expressed by converting the area A of FIG. 4 (the driving energy consumption of the vehicle determined by the driving class of the vehicle) into 'the power generation strategy of the fuel cell 100 according to the energy consumption efficiency of the fuel cell 100', based on the numerical values described in FIG. 6.

In other words, the tables shown at the top and bottom of FIG. 7 show 'the output of the fuel cell 100 set based on the established power generation strategy of the fuel cell 100' based on 'the energy consumption efficiency of the fuel cell 100 derived based on the data map provided in advance' according to 'the driving energy consumption of the vehicle determined according to the travel route information of the vehicle'.

Continuing to look at area D of FIG. 7, it may be seen that the power generation strategy of the fuel cell 100 is established so that the driving energy consumption of the vehicle matches the reference value, and then the output of the fuel cell 100 is constantly controlled to 10 kW.

This is shown on the premise that the output of the fuel cell 100 is 10 kW in a state where the system efficiency of the fuel cell 100 is the highest as shown in FIG. 6, and this is the merely exemplary value to help the understanding of the present disclosure, and the content of the present disclosure should not be viewed as being limited by the present description.

Meanwhile, in FIG. 7, the remaining sections except for the D area are referred to as 'reduction of the charging amount in the battery 400 (Battery SOC down)' or 'stop of power generation of the fuel cell 100 (FC Stop)', which will be described later.

As a result, using the driving energy consumption of the vehicle at a point in time when the energy consumption efficiency of the fuel cell 100 is the highest as described above as the reference value, the power generation strategy of the fuel cell 100 is established so that the driving energy consumption of the vehicle determined for each driving section matches the reference value. Therefore, it is possible to control the output of the fuel cell 100 to be kept constant.

Accordingly, it is possible to secure the durability of the fuel cell 100 while improving the fuel efficiency of the fuel cell vehicle, and the revolutions per minute (RPM) of an air compressor (ACP, not shown) driven for power generation of the fuel cell 100 is also kept constant, saving power consumption of the fuel cell 100 system.

For reference, in FIG. 9, in a section where the required output curve (E) of the vehicle is higher than the output curve (G) of the fuel cell 100, the battery 400 is discharged to compensate for the insufficient output (battery discharging), and in a section where the required output curve (E) of the vehicle is lower than the output curve (G) of the fuel cell 100, the battery 400 may be charged through the surplus output (battery charging).

That is, even if the output of the fuel cell 100 is kept constant, the voltage required by the motor 600 of the vehicle may be sufficiently supplied by appropriately performing the charging/discharging strategy of the battery 400 as described above, and there is advantage of further increasing the energy consumption efficiency of the fuel cell 100 system.

On the other hand, the system for improving fuel efficiency of a fuel cell vehicle according to an exemplary embodiment of the present disclosure further includes the battery 400 that provides driving energy to the vehicle. The controller 300 is configured to control the power generation of the fuel cell 100 according to the predetermined power generation strategy of the fuel cell 100 in a corresponding driving section among the driving sections when the vehicle arrives at each driving section, while comparing the charging amount of the battery 400 in each driving section with a preset value and calibrating the power generation strategy of the fuel cell 100 according to the comparison result.

First, the controller 300 of the system for improving fuel efficiency of a fuel cell vehicle according to an exemplary embodiment of the present disclosure may calibrate the power generation strategy of the fuel cell 100 so that the power generation of the fuel cell 100 is reduced when the charge amount of the battery 400 is higher than a preset set value.

Next, the controller 300 of the system for improving fuel efficiency of a fuel cell vehicle according to an exemplary embodiment of the present disclosure calibrates the power generation strategy of the fuel cell 100 to increase the power generation of the fuel cell 100 when the charge amount of the battery 400 is lower than a preset value.

In the system for improving fuel efficiency of a fuel cell vehicle according to an exemplary embodiment of the present disclosure, the 'charge amount of the battery 400' refers to a value expressed as a percentage (%) by dividing the currently available capacity of the battery 400 by the total capacity of the battery 400, which is generally expressed as 'State of Charge (SOC)'. When the charge amount of the battery 400 is 100%, it means that the battery 400 is fully charged, and conversely, when the charge amount of the battery 400 is 0%, it means that the battery 400 is completely consumed.

As described above with reference to FIG. 9, even when the output of the fuel cell 100 is kept constant, the voltage required by the motor 600 of the vehicle may be sufficiently supplied by performing an appropriate charging/discharging strategy of the battery 400.

However, depending on the driving situation of the vehicle, a phenomenon in which the charge amount of the battery 400 is excessively high or low (overcharge or overdischarge) may occur due to an unexpected cause. Furthermore, the overcharging or overdischarging of the battery 400 causes aging and performance degradation of the battery 400.

When the battery 400 is overcharged above a certain voltage, there is a risk of explosion as a chemical reaction starts inside the battery 400 to generate gas and heat, and when the battery 400 is discharged below a certain voltage, the battery 400 may be irreversibly damaged.

Therefore, in the system for improving fuel efficiency of a fuel cell vehicle according to an exemplary embodiment of the present disclosure, to secure durability of the battery 400 by preventing overcharging or overdischarging of the battery 400, the charge amount of the battery 400 is controlled to be used in a stable range.

That is, the controller 300 of the present disclosure may set an upper limit value and a lower limit value on the charge amount of the battery 400 to prevent overcharging or overdischarging of the battery 400. In other words, in the present disclosure, the 'preset value' may be understood as an upper limit value and lower limit value of the charge amount of the battery 400 set to prevent overcharging or overdischarging of the battery 400.

The controller 300 of the present disclosure may calibrate the power generation strategy of the fuel cell 100 so that the power generation of the fuel cell 100 is reduced when the charge amount of the battery 400 is higher than a preset value. Here, the preset value refers to the upper limit of the charge amount of the battery 400. That is, when the charge amount of the battery 400 exceeds the upper limit, the power generation of the fuel cell 100 is reduced and the battery 400 is discharged to meet the required output of the vehicle. As the battery 400 is discharged, the charge amount of the battery 400 is reduced, so that it is possible to avoid the overcharge situation of the battery 400.

Also, the controller 300 of the present disclosure may calibrate the power generation strategy of the fuel cell 100 so that the power generation of the fuel cell 100 increases when the charge amount of the battery 400 is lower than a preset value. Here, the preset value refers to a lower limit value of the charge amount of the battery 400. That is, when the charge amount of the battery 400 is lowered to less than the lower limit, the power generation of the fuel cell 100 is increased to generate surplus output, and the battery 400 is charged through the surplus output. As the battery 400 is charged, the charge amount of the battery 400 is increased, so that the overdischarge situation of the battery 400 may be avoided.

For reference, although both S510 and S530 in FIG. 2 show that the charge amount of the battery 400 is compared with a preset set value, it is understood that the set value in S510 refers to the upper limit of the charge amount of the battery 400, and the set value in S530 refers to the lower limit of the charge amount of the battery 400.

As a result, the controller 300 of the present disclosure compares the charge amount of the battery 400 with a preset value in each driving section, and calibrates the power generation strategy of the fuel cell 100 to change the power generation of the fuel cell 100 according to the comparison result, and thus, the charge amount of the battery 400 is controlled to be used within a stable range.

Accordingly, the durability of the fuel cell 100 is improved by maximizing the output section in which the energy consumption efficiency of the fuel cell 100 is high, and the durability of the battery 400 is additionally secured by preventing overcharging or overdischarging of the battery 400.

FIG. 3 is a diagram for describing the driving energy consumption of the vehicle determined for each of driving sections divided through the travel route information of the vehicle, and FIG. 5 is a diagram for describing a case in which the regenerative braking of a fuel cell vehicle is performed.

With reference to FIGS. 3 and 5, the controller 300 of the system for improving fuel efficiency of a fuel cell vehicle according to an exemplary embodiment of the present disclosure derives the energy consumption efficiency of the fuel cell 100 through the travel route information of the vehicle for each driving section, further determines whether regenerative braking of the fuel cell vehicle may be performed, and may establish the power generation strategy of the fuel cell 100 to stop the power generation of the fuel cell 100 when the regenerative braking of the fuel cell vehicle may be performed.

Currently, most commercial vehicles, including fuel cell vehicles, have a regenerative braking function applied to improve fuel efficiency of the vehicle.

The regenerative braking energy generated by the regenerative braking function in the fuel cell vehicle is used to charge the battery 400. Accordingly, the power generation of the fuel cell 100 for the driving energy of the vehicle or the charging of the battery 400 may be reduced by the charge amount of the battery 400 by the regenerative braking energy, so that there is an advantage in that the fuel efficiency of the fuel cell vehicle and the durability of the fuel cell 100 may be improved.

For reference, the regenerative braking energy may be understood to mean a counter electromotive force generated in the motor 600 of the vehicle by the inertia force of the driving vehicle during deceleration or coasting operation of the vehicle.

Furthermore, the coasting operation refers to a state in which the vehicle is driven with inertia force according to a current speed in a state where the vehicle's user does not step on both the accelerator and the brake while the vehicle is driving. The deceleration operation refers to a state in which the vehicle speed is rapidly decelerated by the vehicle's user stepping on the brake while the vehicle is driving.

Therefore, in the fuel cell vehicle, the regenerative braking is generally performed in a downhill section. Accordingly, FIG. 3 illustrates an additional determination of whether the regenerative braking may be performed only when the slope of the road in the expected travel route of the vehicle corresponds to a downhill slope.

For reference, because the specific working principle for determining whether to perform the regenerative braking corresponds to a matter obvious in the art, a description thereof will be omitted.

Accordingly, the controller 300 of the present disclosure may establish the power generation strategy of the fuel cell 100 to stop the power generation of the fuel cell 100 when the regenerative braking of the fuel cell vehicle may be performed. This is represented as region B in FIG. 5.

With reference to FIG. 5, for example, when it is determined that any one driving section of the expected travel route of the vehicle divided into a plurality of driving sections can perform the regenerative braking of the fuel cell vehicle, the controller 300 establishes the power generation strategy of the fuel cell 100 so that the power generation of the fuel cell 10 in a corresponding driving section is to be stopped (FC Stop).

This process may be equally performed in the entire sections of the expected travel route of the vehicle divided into a plurality of driving sections. In other words, it is possible to further determine whether the regenerative braking may be performed for each driving section and establish the power generation strategy of the fuel cell 100 based on the determination result.

Accordingly, when the regenerative braking may be performed, the regenerative braking is performed, and when the regenerative braking cannot be performed, the power generation of the fuel cell 100 is controlled according to the power generation strategy established based on the energy consumption efficiency of the fuel cell 100 as described above. Therefore, there is an advantage in that the fuel efficiency of the fuel cell vehicle and the durability of the fuel cell 100 may be more effectively improved.

Furthermore, when the system for improving fuel efficiency of a fuel cell vehicle according to an exemplary embodiment of the present disclosure further includes the battery 400 that provides driving energy to the vehicle. When the regenerative braking of the fuel cell vehicle may be performed, the controller 300 can control the battery 400 to reduce the charge amount of the battery 400 before the vehicle arrives at the driving section in which the power generation strategy of the fuel cell 100 is established to stop the power generation of the fuel cell 100.

As described above, the regenerative braking energy generated by the regenerative braking function in the fuel cell vehicle is used to charge the battery 400. However, the upper and lower limits are set for the battery 400 to prevent overcharging or overdischarging, and the battery 400 is controlled so that the charge amount of the battery 400 is used within a stable range.

If an overcharging situation of the battery 400 occurs or is expected, because the battery 400 cannot be charged any more, the regenerative braking energy generated during deceleration or coasting of the vehicle cannot be stored in the battery 400.

Therefore, to secure the capacity of the battery 400 in which the regenerative braking energy may be stored, the controller 300 of the present disclosure can control the battery 400 to reduce the charge amount of the battery 400 before the regenerative braking of the fuel cell vehicle is performed. This is represented as region C in FIG. 5.

With reference to FIG. 5, for example, when it is determined that the regenerative braking of the fuel cell vehicle may be performed in any one driving section of the expected travel route of the vehicle divided into a plurality of driving sections, the controller 300 may control the battery 400 to reduce the charge amount of the battery 400 (Battery SOC down) in the driving section before the vehicle arrives at the corresponding driving section.

This process may be performed in the same way in every previous driving section of the driving section in which it is determined that regenerative braking of the fuel cell vehicle may be performed, with respect to the entire sections of the expected travel route of the vehicle divided into a plurality of driving sections.

As a result, as the capacity of the battery 400 in which the regenerative braking energy may be stored may be sufficiently secured, a situation in which the regenerative braking is inevitably stopped may be prevented in advance, and the regenerative braking is stably performed. Therefore, there is an effect of improving the fuel efficiency of the fuel cell vehicle and the durability of the fuel cell 100.

FIG. 2 is a flowchart of a method for controlling a system for improving fuel efficiency of a fuel cell vehicle according to an exemplary embodiment of the present disclosure.

With reference to FIG. 2, a method of controlling the system for improving fuel efficiency of a fuel cell vehicle according to an exemplary embodiment of the present disclosure includes the steps of collecting, by the information collection unit, the travel route information of the vehicle including at least one of a road condition and traffic condition for the expected travel route of the vehicle (S100), dividing, by the controller, the expected travel route into a plurality of driving sections through the travel route information of the vehicle collected by the information collection unit (S200), establishing, by the controller, the power generation strategy of the fuel cell for each driving section (S310, S320, S330), and controlling, by the controller, the power generation of the fuel cell according to the power generation strategy of the fuel cell in the corresponding driving section in which the strategy is established in advance when the vehicle arrives at each driving section (S400, S410, S420, S510, S520, S530, S540, S600, S700).

In the step (S200) of dividing the expected travel route into a plurality of driving sections of the method of controlling the system for improving fuel efficiency of a fuel cell vehicle according to an exemplary embodiment of the present disclosure, the energy consumption efficiency of the fuel cell is derived by the controller through the travel route information of the vehicle for each driving section (S320). In the step of establishing the power generation strategy of the fuel cell (S310, S320, S330), the power generation strategy of the fuel cell may be established according to the energy consumption efficiency of the fuel cell derived from the controller (S330).

Furthermore, in the step (S200) of dividing the expected travel route into a plurality of driving sections of the method of controlling the system for improving fuel efficiency of a fuel cell vehicle according to an exemplary embodiment of the present disclosure, the driving energy consumption of the vehicle is determined by the controller through the travel route information of the vehicle (S310), and the energy consumption efficiency of the fuel cell is derived based on a data map provided in advance according to the determined driving energy consumption of the vehicle (S320). In the step of establishing the power generation strategy of the fuel cell (S310, S320, S330), the driving energy consumption of the vehicle at a point in time when the energy consumption efficiency of the fuel cell is the highest is set in the controller as a reference value. The power generation strategy of the fuel cell is established so that the driving energy consumption of the vehicle determined for each driving section matches the reference value. The data map may take as an input the driving energy consumption of the vehicle determined according to the travel route information of the vehicle and as an output the energy consumption efficiency of the fuel cell (S330).

Furthermore, the step (S400, S410, S420, S510, S520, S530, S540, S600, S700) of controlling the power generation of the fuel cell of the method of controlling the system for improving fuel efficiency of a fuel cell vehicle according to an exemplary embodiment of the present disclosure may further include the steps of comparing, by the controller, the charge amount of the battery with a preset set value in each driving section (S510, S530) and calibrating, by the controller, the power generation strategy of the fuel cell according to the comparison result (S520, S540).

On the other hand, in the step (S200) of dividing the expected travel route into a plurality of driving sections of the method of controlling the system for improving fuel efficiency of a fuel cell vehicle according to an exemplary embodiment of the present disclosure, the energy consumption efficiency of the fuel cell is derived by the controller through the travel route information of the vehicle for each driving section, and whether the regenerative braking of the fuel cell vehicle may be performed is further determined (S400). In the step of establishing the power generation strategy of the fuel cell (S310, S320, S330), the power generation strategy of the fuel cell may be established to stop the power generation of the fuel cell (S410) when it is determined in the controller that the regenerative braking of the fuel cell vehicle may be performed.

Furthermore, in the step (S400, S410, S420, S510, S520, S530, S540, S600, S700) of controlling the power generation of the fuel cell of the method of controlling the system for improving fuel efficiency of a fuel cell vehicle according to an exemplary embodiment of the present disclosure, when the controller concludes that the regenerative braking of the fuel cell may be performed, the battery may be controlled so that the charge amount of the battery is reduced (S420) before the vehicle arrives at a driving section in which the power generation strategy of the fuel cell is established to stop the power generation of the fuel cell.

In each step of the method of controlling the system for improving fuel efficiency of a fuel cell vehicle according to an exemplary embodiment of the present disclosure as described above, because the specific control method and operation principle by the controller 300 are the same as those described above in the system for improving fuel efficiency of a fuel cell vehicle according to an exemplary embodiment of the present disclosure, a repeated description thereof will be omitted.

Accordingly, as described above, according to the system for improving fuel efficiency of a fuel cell vehicle and the control method of the present disclosure, the expected travel route of the vehicle is divided into a plurality of driving sections based on the travel route information of the vehicle collected from the navigation device of the vehicle, etc., and the power generation strategy of the fuel cell 100 is established for each driving section. Therefore, there is an advantage of optimizing fuel efficiency in the entire travel route of the vehicle.

Furthermore, the actual energy consumption of the fuel cell 100 may be reflected by controlling the power generation of the fuel cell 100 according to the power generation strategy established based on the energy consumption efficiency of the fuel cell 100 for each driving section. When a certain condition is met, the power generation strategy of the fuel cell 100 may be calibrated, so that the output section with high energy consumption efficiency of the fuel cell 100 may be used, improving the durability of the fuel cell 100.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for improving fuel efficiency of a vehicle, the system comprising:
a fuel cell that provides driving energy to the vehicle;
an information collection unit including a navigation device and configured to collect travel route information of the vehicle including at least one of a road condition or a traffic condition for an expected travel route of the vehicle, by using the navigation device included in the information collection unit; and
a controller that is connected to the information collection unit and configured to divide the expected travel route into a plurality of driving sections through the travel route information of the vehicle collected in the information collection unit, to establish a power generation strategy of the fuel cell for each driving section of the plurality of driving sections, and to control power generation of the fuel cell according to a predetermined power generation strategy of the fuel cell in a corresponding driving section among the plurality of driving sections when the vehicle arrives at each driving section of the plurality of driving sections,
wherein the controller is configured to derive energy consumption efficiency of the fuel cell through the travel route information of the vehicle for each driving section of the plurality of driving sections, and to establish the power generation strategy of the fuel cell according to the derived energy consumption efficiency of the fuel cell, wherein the controller is configured to determine driving energy consumption of the vehicle through the travel route information of the vehicle for each driving section of the plurality of driving sections, and to derive the energy consumption efficiency of the fuel cell according to a data map provided in advance according to the determined driving energy consumption of the vehicle, wherein the data map includes the driving energy consumption of the vehicle determined according to the travel route information of the vehicle as an input thereof and the energy consumption efficiency of the fuel cell as an output thereof, wherein the controller is configured to establish the power generation strategy of the fuel cell according to the energy consumption efficiency of the fuel cell derived based on the data map, and to establish the power generation strategy of the fuel cell so that the driving energy consumption of the vehicle determined for each driving section of the plurality of driving sections matches a reference value, and wherein the reference value is the driving energy consumption of the vehicle at a point in time when the energy consumption efficiency of the fuel cell is highest.

2. The system of claim 1, further including:

a battery that provides driving energy to the vehicle, wherein when the vehicle arrives at each driving section of the plurality of driving sections, the controller is configured to control the power generation of the fuel cell according to the predetermined power generation strategy of the fuel cell in the corresponding driving section, and to compare a charge amount of the battery with a preset value in each driving section of the plurality of driving sections and to calibrate the power generation strategy of the fuel cell according to a result of the comparing.

3. The system of claim 2, wherein the controller is configured to calibrate the power generation strategy of the fuel cell so that the power generation of the fuel cell is reduced when the charge amount of the battery is higher than the preset value.

4. The system of claim 2, wherein the controller is configured to calibrate the power generation strategy of the fuel cell so that the power generation of the fuel cell is increased when the charge amount of the battery is lower than the preset value.

5. The system of claim 1, wherein the controller is configured to derive the energy consumption efficiency of the fuel cell through the travel route information of the vehicle for each driving section of the plurality of driving sections, and further to determine whether regenerative braking of the vehicle is able to performed, and to establish the power generation strategy of the fuel cell so that the power generation of the fuel cell is stopped when the controller concludes that the regenerative braking of the vehicle is able to be performed.

6. A system for improving fuel efficiency of a vehicle, the system comprising:

a fuel cell that provides driving energy to the vehicle;

an information collection unit including a navigation device and configured to collect travel route information of the vehicle including at least one of a road condition or a traffic condition for an expected travel route of the vehicle, by using the navigation device included in the information collection unit; and a controller that is connected to the information collection unit and configured to divide the expected travel route into a plurality of driving sections through the travel route information of the vehicle collected in the information collection unit, to establish a power generation strategy of the fuel cell for each driving section of the plurality of driving sections, and to control power generation of the fuel cell according to a predetermined power generation strategy of the fuel cell in a corresponding driving section among the plurality of driving sections when the vehicle arrives at each driving section of the plurality of driving sections, wherein the controller is configured to derive energy consumption efficiency of the fuel cell through the travel route information of the vehicle for each driving section of the plurality of driving sections, and further to determine whether regenerative braking of the vehicle is able to performed, and to establish the power generation strategy of the fuel cell so that the power generation of the fuel cell is stopped when the controller concludes that the regenerative braking of the vehicle is able to be performed; and a battery that provides driving energy to the vehicle, wherein when the controller concludes that the regenerative braking of the vehicle is able to be performed, the controller is configured to control the battery to reduce a charge amount of the battery before the vehicle arrives at a driving section in which the power generation strategy of the fuel cell is established to stop the power generation of the fuel cell.

7. A method of controlling a system for improving fuel efficiency of a vehicle, the method comprising:

collecting, by an information collecting unit, travel route information of the vehicle including at least one of a road condition and a traffic condition for an expected travel route of the vehicle, by using a navigation device included in the information collection unit;

dividing, by a controller connected to the information collecting unit, the expected travel route into a plurality of driving sections through the travel route information of the vehicle collected by the information collection unit;

establishing, by the controller, a power generation strategy of a fuel cell for each driving section of the plurality of driving sections; and controlling, by the controller, power generation of the fuel cell according to the power generation strategy of the fuel cell established by the controller in advance in a corresponding driving section when the vehicle arrives at each driving section of the plurality of driving sections, wherein the fuel cell provides driving energy to the vehicle, wherein in the dividing the expected travel route into the plurality of driving sections, energy consumption efficiency of the fuel cell is derived by the controller through the travel route information of the vehicle for each driving section of the plurality of driving sections, in the establishing the power generation strategy of the fuel cell, the power generation strategy of the fuel cell is established by the controller according to the energy consumption efficiency of the fuel cell derived by the controller, and wherein in the dividing the expected travel route into the plurality of driving sections, driving energy consumption of the vehicle is determined by the controller through the travel route information of the vehicle, and the energy consumption efficiency of the fuel cell is derived by the controller based on a data map provided in advance according to the determined driving energy consumption of the vehicle, in the establishing the power generation strategy of the fuel cell, the driving energy consumption of the vehicle at a point in time when the energy consumption efficiency of the fuel cell is highest is set by the controller as a reference value, and the power generation strategy of the fuel cell is established so that the driving energy consumption of the vehicle determined for each driving section of the plurality of driving sections matches the reference value, the data map includes the driving energy consumption of the vehicle determined according to the travel route information of the vehicle as an input thereof and the energy consumption efficiency of the fuel cell as an output thereof.

8. The method of claim 7, wherein the controlling the power generation of the fuel cell further includes:

comparing, by the controller, a charge amount of a battery with a preset value in each driving section of the plurality of driving sections, wherein the battery is configured to provide driving energy to the vehicle; and calibrating, by the controller, the power generation strategy of the fuel cell according to a result of the comparing.

9. The method of claim 8, wherein the controller is configured to calibrate the power generation strategy of the fuel cell so that the power generation of the fuel cell is reduced when the charge amount of the battery is higher than the preset value.

10. The method of claim 8, wherein the controller is configured to calibrate the power generation strategy of the fuel cell so that the power generation of the fuel cell is increased when the charge amount of the battery is lower than the preset value.

11. The method of claim 7, wherein in the dividing the expected travel route into the plurality of driving sections, the energy consumption efficiency of the fuel cell is derived by the controller through the travel route information of the vehicle for each driving section of the plurality of driving sections, and the controller is further configured to determine whether regenerative braking of the vehicle is able to be performed, in the establishing the power generation strategy of the fuel cell, the power generation strategy of the fuel cell is established by the controller to stop the power generation of the fuel cell when the controller concludes that the regenerative braking of the vehicle is able to be performed.

12. The method of claim 11, wherein in the controlling the power generation of the fuel cell, when the controller concludes that the regenerative braking of the vehicle is able to be performed, a battery is controlled by the controller to reduce a charge amount of the battery before the vehicle arrives at a driving section in which the power generation strategy of the fuel cell is established by the controller to stop the power generation of the fuel cell, wherein the battery provides driving energy to the vehicle.

* * * * *